Jan. 23, 1968 G. T. McCLURE 3,365,027
RAILWAY CAR TRUCK BRAKE ASSEMBLY
Filed Dec. 8, 1966 3 Sheets-Sheet 2

INVENTOR.
GLENN T. McCLURE
BY
A.A. Steinmiller
ATTORNEY

Jan. 23, 1968 G. T. McCLURE 3,365,027
RAILWAY CAR TRUCK BRAKE ASSEMBLY
Filed Dec. 8, 1966 3 Sheets-Sheet 3
● FIXED   ○ MOVABLE
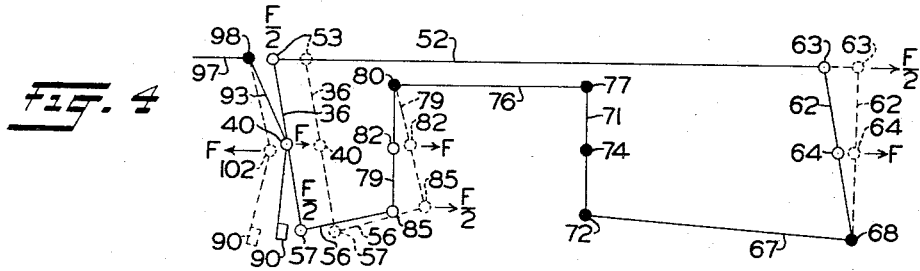
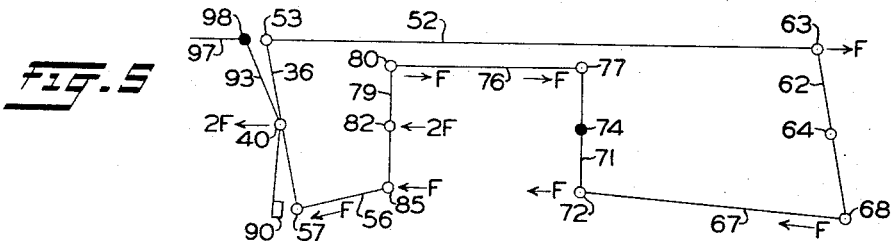
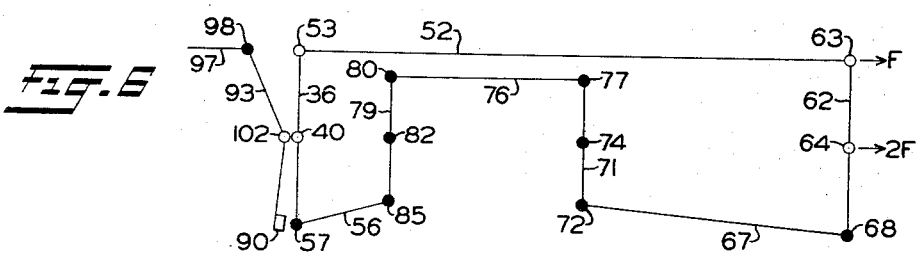
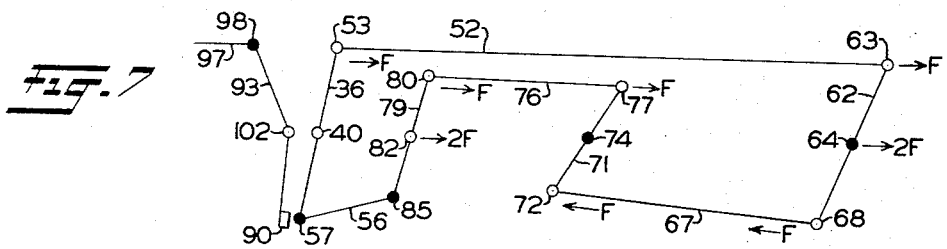
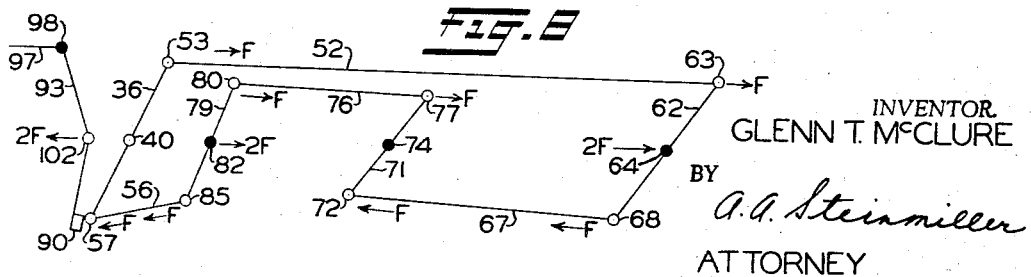
INVENTOR.
GLENN T. McCLURE
BY
A. A. Steinmiller
ATTORNEY

United States Patent Office 3,365,027
Patented Jan. 23, 1968

3,365,027
RAILWAY CAR TRUCK BRAKE ASSEMBLY
Glenn T. McClure, McKeesport, Pa., assignor to Westinghouse Air Brake Company, Wilmerding, Pa., a corporation of Pennsylvania
Filed Dec. 8, 1966, Ser. No. 600,256
12 Claims. (Cl. 188—47)

This invention relates to a brake assembly for railway rolling stock and more particularly to a brake assembly for railway cars having three axle six wheel car trucks.

One of the present day conventional brake assemblies for three axle six wheel car trucks consists of one or more brake cylinders carried on the underside of the car body or on the truck frame and having the piston rods thereof connected through rods and levers to brake shoes, independently hung on the brake shoe hangers from the truck frame, to effect movement of the brake shoes into and out of braking contact with the tread surface of the car truck wheels.

Due to wear at the number of pivotal connections between the rods and levers of the conventional brake assemblies, and due to wear of the conventional cast iron brake shoes, automatic slack adjusters are desirable to take up slack in the rigging as it occurs.

The comparatively recent commercial adoption and increasing use by the railroads of composition brake shoes for railway rolling stock has made it desirable to devise new and different types of brake assemblies to utilize the benefits to be gained from the desirable characteristics of the composition brake shoe compared to the old conventional cast iron type of brake shoe.

Composition brake shoes have a considerably higher and more constant friction coefficient as compared to that of cast iron shoes. Therefore, the composition brake shoes require a lesser brake applying force than do conventional cast iron shoes for an equivalent braking effect. In the copending application Ser. No. 579,142, filed Sept. 13, 1966, and assigned to the assignee of the present application, there is shown and described a novel brake assembly for a two axle four wheel railway car truck which includes a conventional truss-type brake beam and a brake beam carrying a single brake cylinder device substantially midway its length the piston rod of which cylinder device is operatively connected by a parallelogram type of linkage to the truss-type brake beam. This brake assembly is operable upon the supply of fluid under pressure to the brake cylinder device to effect movement of the two brake beams in opposite directions to cause the application of the same brake applying force to the tread surface of each one of the four wheels of the car truck.

It is the general purpose of this invention to provide a novel brake assembly for a three axle six wheel railway car truck, basically similar in operation to the brake assembly disclosed in the above-mentioned copending application and utilizing a simple and relatively low cost arrangement involving only one brake-cylinder-carrying brake beam associated with a pair of non-brake-cylinder-carrying brake beams and connected thereto through a linkage which is actuable through fluid pressure forces exerted by the brake cylinder device or through manually applied forces.

It is a further purpose of this invention to provide a novel brake assembly for a three axle six wheel type of car truck which requires one brake-cylinder-carrying brake beam and two non-brake-cylinder-carrying brake beams which three beams are connected by a novel linkage in such a manner that operation thereof may be effected manually without requiring an additional separate linkage for hand or manual operation.

More particularly, according to the present invention, this novel brake assembly includes one brake-cylinder-carrying brake beam and two non-brake-cylinder-carrying brake beams operatively connected by a linkage comprising two pairs of levers, the first pair being of equal length and the second pair also being of equal length and differing in length from the first pair, and four links each of which connects one end of one of the levers with one end of another of the levers. One lever of each pair of levers is pivotally mounted substantially midway its ends on a corresponding one of the two non-brake-cylinder-carrying brake beams. The other levers of the two pair of levers are respectively pivotally mounted substantially midway their ends on the frame of the truck and on the exterior end of the piston rod of the brake cylinder device carried by the one brake-cylinder-carrying brake beam. This brake assembly is operable upon the supply of fluid under pressure to the brake cylinder device to effect movement of the two non-brake-cylinder-carrying brake beams in a direction opposite that of the brake-cylinder-carrying brake beam to cause the application of the same brake applying force to the tread surface of each one of the six wheels of the car truck. The hand brake wheel located at the corresponding end of the car may be operably connected by any suitable means to one end of that one of the plurality of levers adjacent the end of the car whereby the brake can be applied manually by a force transmitted from the hand brake wheel through the above-described links and levers to the three brake beams.

In the accompanying drawings:

FIG. 4 is a schematic view of the linkage shown in FIG. 1 showing the release position of this linkage in full lines and the fluid power brake applied position of this linkage in broken lines together with the magntiude and direction of the forces acting on the various members of this linkage when a fluid power brake application is effected.

FIG. 5 is a schematic view of the linkage shown in FIG. 1 prior to movement thereof from its release position in response to the application of a manual force thereto via the usual hand brake wheel located at one end of a railway car.

FIG. 6 is a schematic view of the linkage subsequent to movement of the first one of the three brake beams by the manually applied force to the position in which the brake shoes, carried by this one brake beam are in braking contact with the tread surfaces of the corresponding pair of wheels.

FIG. 7 is a schematic view of the linkage subsequent to movement of the first and second one of the three brake beams by the manually applied force to the position in which the brake shoes carried by the first and second one of the brake beams are in braking contact with the tread surfaces of each corresponding pair of wheels.

FIG. 8 is a schematic view of the linkage subsequent to movement of all three of the brake beams by the manually applied force to the position in which the brake shoes carried by each of the three brake beams are in braking contact with the tread surfaces of each corresponding pair of wheels.

Description

Figure 1:
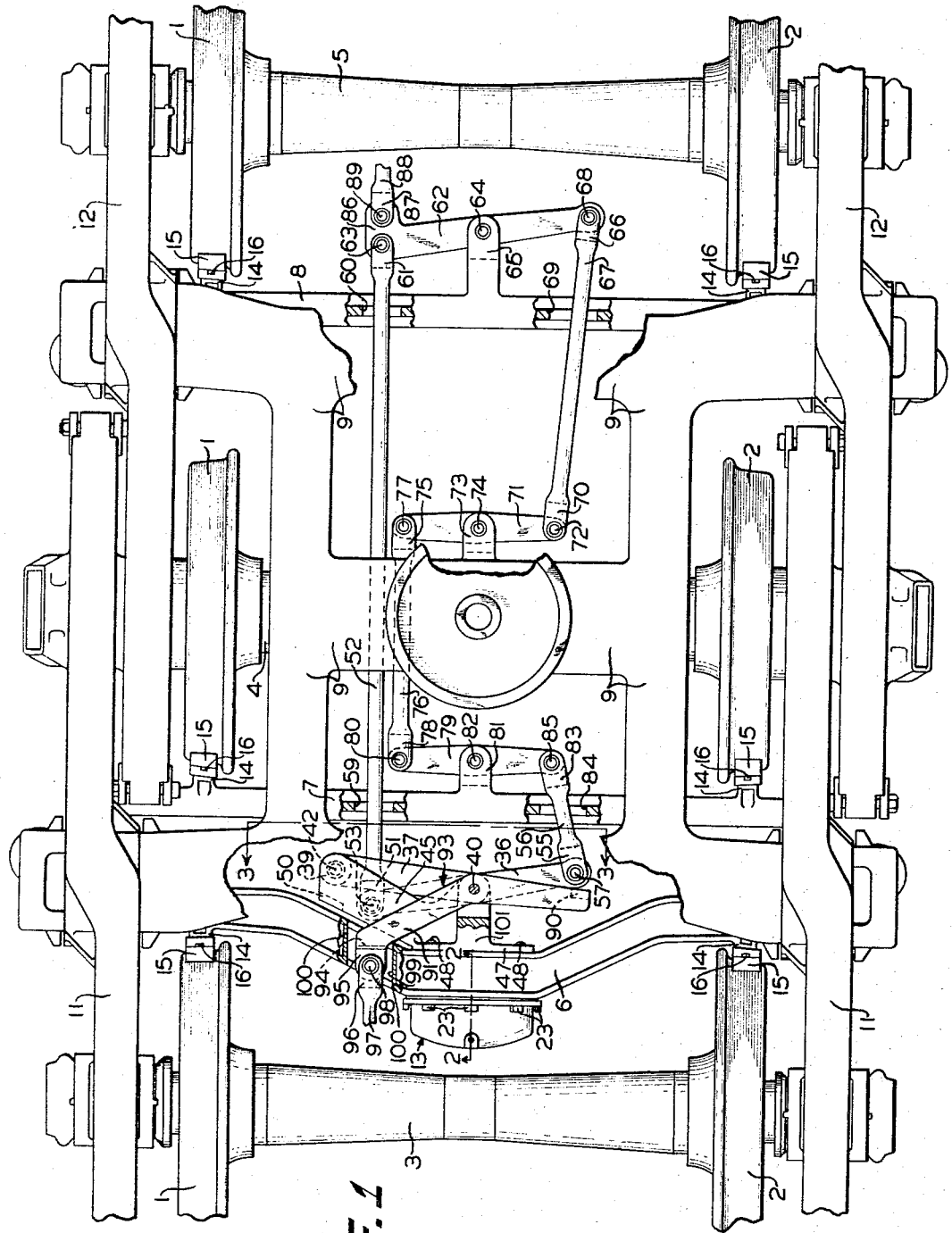
FIG. 1 is a plan view, partially in section, of a brake assembly for a three axle six wheel car truck, showing the manner by which a single brake cylinder device is mounted on a brake-cylinder-carrying brake beam and operatively connected to a pair of non-brake-cylinder-carrying brake beams.

Referring to FIG. 1 of the drawings, the reference numerals 1 and 2 designate respectively the wheels secured at opposite ends of each of three axles 3, 4 and 5 of a three-axle six-wheel railway car truck.

The brake rigging shown in the drawings comprises a cast brake-cylinder-carrying brake beam 6 and two non-brake-cylinder-carrying brake beams 7 and 8 which three brake beams extend crosswise of the car truck and in parallel spaced relation to each other and to a truck bolster 9. The brake beams 6, 7 and 8 are arranged parallel to the truck bolster 9 and are movably supported at each end on one of two side frame members 11 and 12 on each side of the truck in the usual way as hereafter described.

The brake beam 6 is constructed, as hereinafter described, to provide a support for a single brake cylinder device 13, and the brake beams 7 and 8 may be in the form of cast I-beams the webs of which are provided with a pair of properly spaced-apart bores through which extend certain links of a hereinafter described linkage.

A brake head 14 is cast integral with each end of each of the three cast brake beams 6, 7 and 8 adajacent to and on the inboard side of a guide foot (not shown) which also may be cast integral with the respective brake beam. Each guide foot is a flat L-shaped metal member having a leg that is slidably supported in a grooved wear plate and guide member (not shown) which is secured to the corresponding one of the truck side frame members 11 and 12. The wear plate and guide members and guide feet serve to support the brake beams 6, 7 and 8 at the proper height above the rails (that is somewhat below the horizontal diameter of the wheels) the groove in the wear plate and guide member being at a slight angle to the horizontal to permit bodily movement of the brake beams in a direction substantially radially of the associated wheels when a brake application is made.

Each of the brake heads 14 carries a composition brake shoe 15 for contact with the tread of an associated wheel. In customary manner the shoe has a backing plate provided with a key bridge to receive the usual brake shoe key 16 for removably locking the shoe to the brake head.

The brake shoes 15 are operated into and out of contact with their associated wheels 1, 2 by means of the single brake cylinder device 13 which is secured to the brake beam 6 in a manner now to be described.

Figure 2:
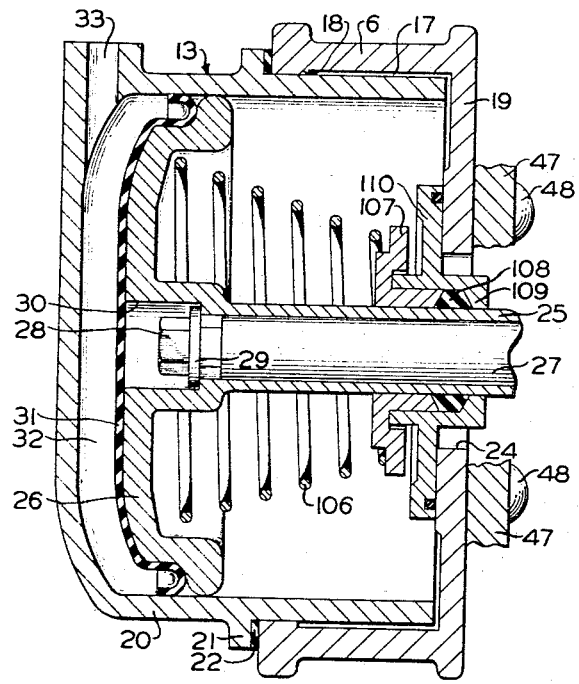
FIG. 2 is a vertical cross-sectional view, on an enlarged scale, taken along the line 2—2 of FIG. 1 and looking in the direction of the arrows showing certain details of the brake cylinder device shown in FIG. 1.

To order to secure the brake cylinder device 13 to the brake beam 6, the web of a somewhat bowed cast H-beam or channel member constituting the brake beam 6 has formed integral therewith (substantially midway its length) a circular opening 17 (FIG. 2). As shown in FIG. 2 of the drawings, the respective opposite ends of this opening 17 are provided with inturned flanges 18 and 19. The inturned flange 18 forms a circular opening substantially the same diameter as the outside diameter of a cup-shaped body 20 of the brake cylinder device 13 which body is provided intermediate its ends with an out-turned flange 21 between which and the inturned flange 18 is disposed a gasket 22 constructed of any suitable resilient material. The out-turned flange 21 and the gasket 22 are provided with a plurality of arcuately spaced smooth bores (not shown) through which extends a plurality of cap screws 23 (FIG. 1) that have screw-threaded engagement with the threaded bottom bores (not shown) provided in that portion of the brake beam 6 extending circumferentially of the opening 17 therein.

The inturned flange 19 (FIG. 2) constitutes a non-pressure head for the brake cylinder device 13. This non-pressure head has therein a bore 24 through which a hollow rod 25 extends, the left-hand end of which is integral with a piston 26 that is slidably mounted in the cup-shaped body 20 of the brake cylinder device 13. The hollow rod 25 is adapted to receive therein a push rod 27 having thereon intermediate its ends a collar (not shown) which is forced against the right-hand end of the hollow rod 25 by a nut 28 that has screw-threaded engagement with external screw-threads formed on a screw-threaded portion of the push rod 27 adjacent the left-hand end thereof it being noted that a washer 29 is interposed between the nut 28 and a shoulder formed by the left-hand end of a counterbore 30 provided in the piston 26 and coaxial with the hollow rod 25 which is integral with this position.

A packing cup 31 is secured to the left-hand side of the piston 26 and cooperates with the cup-shaped body 20 to form a pressure chamber 32 to which fluid under pressure may be supplied via passageway 33 formed in the cup-shaped body 20 and a corresponding pipe (not shown) from the usual brake control valve device of the air brake system on railway cars. Fluid under pressure supplied to the pressure chamber 32 causes movement of the brake cylinder body 20 and the brake beam 6 in one direction, and the piston 26, push rod 27 and the brake beams 7 and 8 in the opposite direction to effect braking contact of the brake shoes 15 carried by the brake beams 6, 7 and 8 with the tread surface of their respective associated wheels, the linear movement of the piston 26 and push rod 27 being twice that of the body 20 since the combined forces acting on the brake beams 7 and 8 is twice that acting on the brake beam 6. The forces acting on these beams 7 and 8 are transmitted thereto through a mechanical linkage now to be described.

Figure 3:
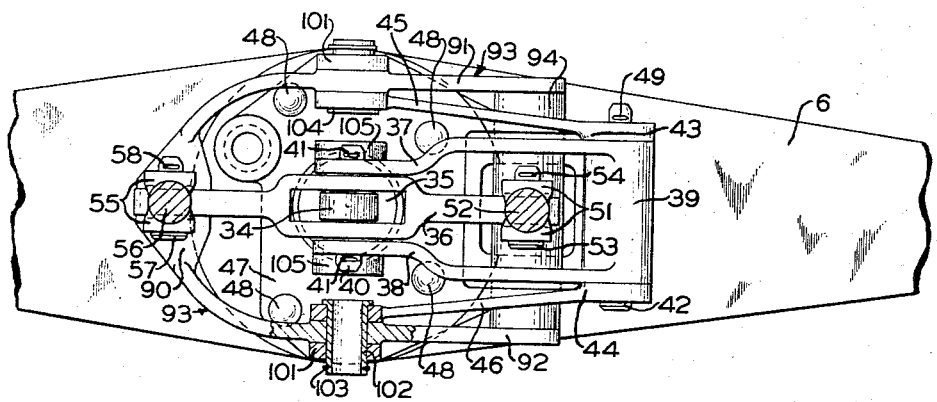
FIG. 3 is a vertical cross-sectional view on an enlarged scale, taken along the line 3—3 of FIG. 1 and looking in the direction of the arrows, showing certain details of a hand brake mechanism and how it is operatively connected to the piston rod of the brake cylinder device shown in FIGS. 1 and 2.

The push rod 27 is provided at its right-hand end with a fulcrum member 34 which, as shown in FIG. 3 of the drawings, is rectangular in cross section and is disposed in an elongated slot 35 formed in a first horizontally disposed lever 36 of the above-mentioned linkage the center of the slot 35 being substantially midway the ends of the lever 36. The fulcrum member 34 of the push rod 27 and the lever 36 are disposed between and operatively connected to a pair of parallel spaced-apart and off-set arms 37 and 38 of a bifurcated hanger member 39 as by, for example, a pin 40 and a pair of cotter pins 41. The right-hand ends of the arms 37 and 38 are integral with a hub member which is rockably mounted on a headed pin 42. The opposite ends of the pin 42 are carried in coaxial bores in a pair of oppositely arranged and inwardly facing bosses 43 and 44 formed respectively on the right-hand ends of a pair of spaced-apart inclined support members 45 and 46 the left-hand ends of which are integral with a bracket member 47 that is secured to the hereinbefore-mentioned inturned flange 19 of the brake beam 6 by a plurality of rivets 48. The pin 42 adjacent the end thereof opposite its head is provided with a bore in which is received a cotter pin 49 that prevents removal of the pin 42. The right-hand ends of the inclined support members 45 and 46 are connected by a web 50 (FIG. 1) which serves to provide rigidity to these support members.

As shown in FIG. 3, the right-hand end of the lever 36 is disposed between the jaws of a clevis 51 formed on the left-hand end of a first link or rod 52 (FIG. 1) and pivotally connected thereto by means such as, for example, a headed pin 53 and a cotter pin 54 (FIG. 3). The left-hand end of the lever 36 is disposed between the jaws of a clevise 55 formed on the left-hand end of a second link or rod 56 (FIG. 1) and pivotally connected thereto by means such as, for example, a headed pin 57 and a cotter pin 58 (FIG. 3).

As shown in FIG. 1, the first rod 52 extends through a bore 59 formed in the web of the cast I-beam constituting the brake beam 7, beneath the truck bolster 9, and through a corresponding bore 60 formed in the web of the cast I-beam constituting the brake beam 8. The right-hand end of the rod 52 is provided with a clevis 61 the jaws of which are disposed on the opposite sides of the upper end of a second horizontally disposed lever 62 which is pivotally connected to the clevis 61 by any suitable means such as, for example, a headed pin 63 and a cotter pin (not shown). The lever 62 is pivotally mounted midway its ends on a headed pin 64 that has its opposite ends anchored in coaxial bores (not shown) formed in the jaws of a clevis 65 that is cast integral with the brake beam 8 this clevis being located substantially midway the length of the beam 8. The pin 64 adjacent the end thereof opposite its head is provided with a bore (not shown) in which is received a cotter pin (not shown) that prevents removal of the pin 64 by vibration occurring while a train is traveling at a high speed.

The lower end of the lever 62 is disposed between the jaws of a clevis 66 formed on the right-hand end of a third link or rod 67 and is pivotally connected thereto by means such as, for example, a headed pin 68 and a cotter pin (not shown).

As can be seen from FIG. 1, the third rod 67 extends through a second bore 69 formed in the web of the brake beam 8 it being noted that the axis of this bore 69 is parallel to the axis of the bore 60 in this web. The rod 67 is disposed substantially parallel to the rod 52 and has provided on its left-hand end a clevis 70 between the jaws of which is disposed the lower end, as viewed in FIG. 1, of a third horizontally arranged lever 71 which is pivotally connected thereto as by a headed pin 72 and a cotter pin (not shown).

The lever 71 extends between the jaws of a clevis 73 which is formed integral with the truck bolster 9. The lever 71 is rockably mounted midway its ends on the clevis 73 as by means such as, for example, a headed pin 74 the respective opposite ends of which are anchored in this clevis 73. The upper end, as viewed in FIG. 1, of the lever 71 is disposed between the jaws of a clevis 75 formed on the right-hand end of a fourth link or rod 76 and is pivotally connected to this clevis by means such as, for example, a headed pin 77 and a cotter pin (not shown).

The fourth rod 76, as shown in FIG. 1, extends beneath the truck bolster 9 and has formed at its left-hand end a clevis 78 between the jaws of which is disposed the upper end, as viewed in FIG. 1, of a fourth horizontal arranged lever 79 which is pivotally connected to this clevis 78 as by a headed pin 80 and a cotter pin (not shown).

The length of the lever 79 is substantially the same as that of the hereinbefore-mentioned lever 71. This lever 79 extends between the jaws of a clevis 81 which is formed integral with the brake beam 7 and located substantially midway the length of this beam. The lever 79, like the lever 71, is rockably mounted midway its ends on a headed pin 82 the respective opposite ends of which are anchored in the jaws of the clevis 81. The lower end of the lever 79, as viewed in FIG. 1, is disposed between the jaws of a clevis 83 formed on the right-hand end of the hereinbefore-mentioned second rod 56 which extends through a bore 84 in the web of the brake beam 7 the axis of which bore is parallel to the axis of the hereinbefore-mentioned bore 59 in the web of this beam. A headed pin 85, which extends through a bore in the lower end of the lever 79 and coaxial bores in the jaws of the clevis 83, provides a pivotal connection between the lever 79 and the rod 56.

The above-mentioned levers 36, 62, 71 and 79 and rods or links 52, 56, 67 and 76 form a mechanical linkage through which force may be transmitted from the piston 26 (FIG. 2) of the brake cylinder device 13 (FIG. 1) to the brake beams 7 and 8 to cause the brake shoes 15 carried by these brake beams to be forced against the tread surface of the corresponding wheels 1, 2 in response to the supply of fluid under pressure to the pressure chamber 32 (FIG. 2) to move the piston 26 and brake cylinder body 20 in opposite directions, it being understood, as hereinbefore mentioned, that the linear travel of the piston 26 is twice that of the brake cylinder body 20.

In order to provide, in customary fashion, for operation of the brakes by hand brake means, that end of the horizontally arranged lever 62 (FIG. 1) to which the rod 52 is pivotally connected by the pin 63 is provided with an arm 86 that is disposed between the jaws of a clevis 87 formed on the left-hand end of a rod 88. This arm 86 is pivotally connected to the clevis 87 by a headed pin 89 that has its opposite ends anchored in the jaws of the clevis 87. The other end (not shown) of the rod 88 may be connected by means such as, for example, a chain (not shown) to the hand brake wheel (not shown) which is located at one end of a railway car. Furthermore, so that the brake shoes 15 carried by the brake heads 14, which are integral with the cast brake-cylinder-carrying brake beam 6, may be forced against the tread surface of the wheels 1, 2 of the axle 3, subsequent to movement of the brake shoes 15 carried by the brake heads 14 of the brake beams 7 and 8 into braking contact with the tread surface of the wheels 1, 2 of axles 4 and 5, by force transmitted from the hand brake wheel to the brake beams 7 and 8 via the chain and rod 88 and the linkage including levers 62, 71 and 79 and rods 67 and 76, the left-hand side of the lower end of the lever 36 is disposed on the right-hand side of and against, as shown in FIG. 1, a web 90 that connects the lower arcuately converging ends of two otherwise parallel spaced-apart arms 91 and 92 (FIG. 3) of a hand brake member 93. These arms 91 and 92 are connected at their upper ends, as viewed in FIG. 1, by a web 94 from the base of which extends a short lever 95 having therein adjacent its left-hand end a bore (not shown). As shown in FIG. 1, the left-hand end of the short lever 95 is disposed between the jaws of a clevis 96 formed at the right-hand end of a rod 97 (FIG. 1) and is operatively connected to the clevis 96 by a headed pin 98 which extends through the bore in the short lever 95 and has its opposite ends anchored in coaxial bores formed in the jaws of this clevis 96. The end of the pin 98 opposite its headed end is provided with a bore for receiving therein a cotter pin (not shown) which prevents removal of the pin 98 by vibration or some other cause. As shown in FIG. 1, the rod 97 extends through an opening 99 provided in the brake beam 6 by two spaced-apart parallel ribs 100 which connect the flanges of the cast H-beam 6. The left-hand end of the rod 97 is anchored by any suitable means (not shown) to the bottom of the car body (not shown).

As shown in FIG. 3 of the drawings, the arm 92 of the hand brake member 93 is disposed between the lower left-hand end of support member 46 of the bracket member 47 and one of a pair of spaced-apart lugs 101 formed integral with this bracket member and is rockably mounted on a hollow headed pin 102 which extends through coaxial bores provided in the support member 46, the arm 92 and the lug 101. This pin 102 is retained in place by a snap ring 103 inserted in a groove provided in that portion of the pin 102 extending below the lug 101. The other arm 91 of the hand brake member 93 is similarly rockably mounted on a hollow headed pin 104. These hollow pins 102 and 104 provide for removal of the pin 40 after the cotter pins 41 are withdrawn therefrom.

Each of the arms 37 and 38 of the hanger member 39 is provided on its left-hand end with a lug 105 integral therewith. Upon movement of the piston 26 (FIG. 2) toward the left-hand end of the cup-shaped body 20 by a conical type release spring 106 interposed between the piston 26 and an annular spring seat 107 disposed in surrounding relation to the hollow rod 25, the lugs 105 are moved into contact with corresponding stops (not shown) formed integral with and extending outward from the bracket member 47 prior to the piston 26 abutting the end wall of the cup-shaped body 20. The provision of the lugs 105 and these stops prevents the transmittal of a hammering force by the piston 26 to the end wall of the cup-shaped body 20 in response to undesired forces transmitted through the brake rigging to the piston 26 as a result of shock and vibrations encountered by the brake rigging while a train is traveling at a high speed and the brakes are released.

As shown in FIG. 2, a hollow rod packing seal 108 constructed of some suitable resilient material such as, for example, rubber, is disposed in surrounding relation to the hollow rod 25 and is interposed between the spring seat 107 and an inturned flange 109 also disposed in surrounding relation to the hollow rod 25 which flange 109 is integral with a plate member 110 that rests against the left-hand side of the hereinbefore-mentioned inturned flange 19.

*Operation*

While the brakes are released the brake beams 6, 7 and 8 and the linkage connecting these brake beams will occupy the position shown in FIG. 1 of the drawings. The release position of this linkage is shown schematically by full lines in FIG. 4. Accordingly, the various links and levers of this linkage are denoted by the same numerals in FIG. 4 as in FIG. 1.

It should be noted in connection with FIG. 4, and also in connection with FIGS. 5 to 8 inclusive, that the pivotal connection between any two members of the linkage when stationary or fixed is denoted by a small solid black circle, and when movable is denoted by a small open circle.

Furthermore, it may be assumed, theoretically at least, that the friction of each pivotal joint or connection of the linkage is the same.

Now, in operation, when it is desired to effect a fluid power brake application, fluid under pressure is admitted to the chamber 32 (FIG. 2) via the passageway and corresponding pipe 33 by operation of the brake control valve device of the usual air brake system on railway cars under the control of the operator. Fluid under pressure thus supplied to the chamber 32 of the brake cylinder device 13 is effective to move the piston 26 and the body 20 in opposite directions. It should be understood, as hereinbefore mentioned, that the travel of the piston 26 must be twice the travel of the body 20 since the combined forces transmitted from the piston 26 to the two brake beams 7 and 8 in the manner now to be described is twice the force transmitted to the brake beam 6 via the end of the cup-shaped body 20. As the piston 26 and the brake cylinder body 20 are moved in opposite directions, the brake beam 6 on which the cylinder body 20 is mounted and the brake beams 7 and 8 move in opposite directions in response to the fluid pressure forces transmitted to these brake beams as the result of the supply of fluid under pressure to the chamber 32.

It will be apparent that the fluid under pressure supplied to the chamber 32 is effective on the left-hand closed end of the cup-shaped brake cylinder body 20 to establish a force F thereon which acts in the direction of the left-hand and that this force will cause movement of the brake beam 6 in the direction of the left-hand, as viewed in FIG. 1, until the brake shoes 15 carried by the brake beam 6 are brought into braking contact with the tread surface of the wheels 1, 2 carried by the axle 3. Thereafter, this fluid pressure force acting on the closed end of the cup-shaped body 20 causes the brake shoes 15 carried by the brake beam 6 adjacent the respective opposite ends thereof to be pressed against the tread surface of the wheels 1, 2 carried by the axle 3 with a force of ½ F.

It will also be apparent that the fluid under pressure supplied to the chamber 32 is effective on the left-hand side of the packing cup 31 secured to the piston 26 to establish a force F on this piston which force acts in the direction of the right hand as viewed in FIGS. 1 and 2 of the drawings. This force F is transmitted to the pin 40 via the hollow rod 25, push rod 27 and fulcrum members 34. Since the pin 40 connects the fulcrum member 34 to the lever 36 midway the length of this lever it will be apparent from FIG. 4 that a force of ½ F is exerted on each of the pins 53 and 57 which pins respectively connect the opposite ends of the lever 36 to the links 52 and 56. The force F acting on the pin 40 therefore, is effective to move the lever 36, without rocking movement, in the direction of the right-hand, as viewed in FIG. 4, until the lever 36 occupies the position indicated by broken lines in this figure.

The force of ½ F exerted on the pin 53 is transmitted through link 52 to the pin 63 which pivotally connects the right-hand end of the link 52 to the upper end of the lever 62.

Since the pin 74 has its opposite ends anchored in the jaws of the clevis 73 which is integral with the stationary truck bolster 9, it should be apparent that the links 67 and 76 and the lever 71 will remain stationary at this time. Consequently, the force of ½ F transmitted via the pin 63 to the upper end of the lever 62 is effective to rock this lever 62 clockwise, as viewed in FIGS. 1 and 4, about the pin 68 which pivotally connects the lower end of the lever 62 to the right-hand end of the now stationary link 67.

As is apparent from FIGS. 1 and 4, the pin 64 connects the lever 62 midway its ends to the clevis 65 which is integral with the brake beam 8. Since the distance between the pins 63 and 68 is twice the distance between the pins 64 and 68, it will be apparent that the pin 64 transmits a force F to the brake beam 8 via the jaws of the clevis 65 (FIG. 1) which force F is effective to move the brake beam 8 in the direction of the right-hand, as viewed in FIG. 1, until the brake shoes 15 carried adjacent the opposite ends of the brake beam 8 are brought into contact with the tread surface of the wheels 1, 2 at the opposite ends of axle 5. Thereafter, each of these brake shoes 15 is pressed against the tread surface of the corresponding wheel with a force of ½ F.

From the foregoing it is apparent that the force of ½ F acting on the pin 63 is effective to rock the lever 62 in a clockwise direction, as viewed in FIG. 4, until this lever 62 occupies the position indicated by broken lines in FIG. 4, it being understood that when the lever 62 occupies this position, each brake shoe 15 carried by the brake beam 8 is pressed against its corresponding wheel carried by the axle 5 with a force of ½ F.

Simultaneously as the force of ½ F transmitted by the pin 53 to the left-hand end of the link 52 is effective in the manner described above to move the brake beam 8 in the direction of the right-hand until the brake shoes 15 carried by this beam are pressed against the tread surface of the wheels 1, 2 carried at the opposite ends of the axle 5 with a force of ½ F, the force of ½ F transmitted to the left-hand end of the link 56 by the pin 57 is transmitted through this link and the pin 85 to the lower end of the lever 79 which is pivotally connected to the link 56 by the pin 85. This force of ½ F transmitted by the pin 85 to the lower end of the lever 79 is effective to rock this lever 79 counterclockwise as viewed in FIGS. 1 and 4, about the pin 80 which pivotally connects the upper end of this lever 79 to the left-hand end of the now stationary link 76.

As is apparent from FIGS. 1 and 4, the pin 82 connects the lever 79 midway its ends to the clevis 81 which is integral with the brake beam 7. Since the distance between the pins 85 and 80 is twice the distance between the pins 82 and 80, it will be apparent that the pin 82 transmits a force of F to the brake beam 7 via the jaws of the clevis 81. This force F is effective to move the brake beam 7 in the direction of the right hand, as viewed in FIG. 1, until the brake shoes 15 carried adjacent the opposite ends of the brake beam 7 are brought into contact with the tread surface of the wheels 1, 2 at the opposite ends of the axle 4. Thereafter, each of these brake shoes 15 is pressed against the tread surface of the corresponding wheel with a force of ½ F.

From the foregoing, it can be seen that the force of ½ F acting on the pin 85 is effective to rock the lever 79 in a counterclockwise direction, as viewed in FIG. 4, until this lever 79 occupies the position indicated by broken lines in FIG. 4, it being understood that when the lever 79 occupies this position each brake shoe 15 carried by the brake beam 7 is pressed against its corresponding wheel carried by the axle 4 with a force of ½ F.

As the brake beam 6 and brake beams 7 and 8 move in opposite directions in the manner explained above, the brake shoes 15 carried by these beams are brought into braking contact with the wheels of the truck to effect a braking action on these wheels.

As the brake beams 6, 7 and 8 are moved, as described above, these beams are supported and guided by the guide feet provided at the respective opposite ends of each beam as each of these feet have sliding contact in a corresponding groove in the wear plate and guide members. As hereinbefore mentioned, the orientation of the wear plate and guide members is such that the brake beams 6, 7 and 8 and the brake shoes 15 carried thereby are moved substantially radially toward the corresponding wheels.

It will be understood that, in view of the parallel disposition of the brake beams 6, 7 and 8 with respect to the truck bolster 9, and since the area of the piston 26 and the cup-shaped end of the body 20 are the same, the supply of fluid under pressure to the chamber 32 produces substantially equalized forces of application of all the brake shoes on the corresponding wheels in the manner hereinbefore explained.

When it is desired to release the brake application, the fluid under pressure previously supplied to the chamber 26 is vented in the usual manner through operation of the brake control valve device of the car brake system under the control of the operator, whereupon the force of the release spring 106 (FIG. 2) acting on the spring seat 107, which rests against the left-hand end of the plate member 110 that in turn abuts the inturned flange 19 of the brake beam 6, moves the brake cylinder body 20 and the piston 26 in a brake releasing direction to move the brake beam 6 and the brake beams 7 and 8 toward each other and the brake shoes 15 carried thereby away from the tread surface of the corresponding wheels to a normal clearance position with respect to the tread surface of the wheels to effect a brake release. It will be understood that the levers 36, 62 and 79 and links 52 and 56 are respectively rocked and moved in the direction opposite that in which they are rocked and moved when effecting a brake application.

Due to the inclination of the grooves in the wear plate and guide members, the brake beams tend to return by action of gravity to their normal relation with respect to the truck bolster 9, in which position the clearance between the brake shoes on any one of the brake beams and their associated wheels is substantially equal to the clearance between the brake shoes on the other brake beams and their associated wheels. However, due to the predominating weight of the brake beam 6 which carries the brake cylinder device 13 over the weight of the brake beams 7 and 8 which carry no brake cylinder devices, the tendency is for the brake beam 6 to travel by action of gravity, upon the release of fluid under pressure from the chamber 32 of the brake cylinder device 13, further down the inclined groove of the wear plate and guide members and thus past the normal intended release position. Therefore, in order to limit the travel of the heaviest of the three brake beams toward its release position, each wear plate and guide member has the groove therein closed at its lower end. This serves as limit stops to movement of the guide feet of brake beam 6 toward the bolster 9.

Let it be supposed that the brakes are released and a trainman desires to effect a manual or hand brake application on a three-axle six-wheel car truck provided with the brake assembly constituting the present invention.

While the brakes are released and prior to effecting a manual brake application, the pins, links and levers comprising the linkage connecting the brake beams 6, 7 and 8 occupy the position in which they are shown schematically in FIG. 5 of the drawings. Accordingly, the various members of this linkage are denoted by the same numerals in FIG. 5 as in FIGS. 1 and 4.

For illustrative purposes, it will be assumed that when a manual brake application is effected, the brake beam 8 is first moved in the direction of the right hand as viewed in FIG. 1 of the drawings, until the brake shoes 15 carried adjacent the respective opposite ends of this beam 8 are moved into contact with the tread surface of the corresponding wheels carried at the opposite ends of the axle 5.

It will be further assumed that, subsequent to movement of the brake beam 8 to the position in which the brake shoes 15 carried thereby are in contact with the tread surface of the corresponding wheels carried by the axle 5, the brake beam 7 is thereafter moved in the direction of the right hand, as viewed in FIG. 1, until the brake shoes 15 carried adjacent the respective opposite ends of this beam 7 are moved into contact with the tread surface of the corresponding wheels carried at the opposite ends of the axle 4.

Finally, it will be assumed that, subsequent to movement of the brake beams 7 and 8 in the direction of the right hand, as viewed in FIG. 1, to the position in which the brake shoes 15 carried adjacent the opposite ends of these brake beams are moved into contact with the tread surface of the corresponding wheels, the brake beam 6 will be moved in the direction of the left hand until the brake shoes 15 carried adjacent the opposite ends of this brake beam 6 are moved into contact with the tread surface of the corresponding wheels carried at the respective opposite ends of the axle 3.

To effect a manual brake application on the three-axle six-wheel car truck, the trainman will manually rotate the hereinbefore mentioned hand brake wheel to which the rod 88 is connected by means such as, for example, a chain as hereinbefore explained. This rotation of the hand brake wheel causes the application of a pulling force F to the rod 88 in the direction of the right hand, as viewed in FIGS. 1, 5, 6, 7 and 8. The force F thus exerted on the rod 88 is transmitted to the arm 86 via the pin 89. This force F transmitted to the arm 86 acts in the direction to effect rocking of the lever 62 clockwise, as viewed in FIG. 1, about the pin 68 from the position in which the lever 62 is shown in FIG. 5 to the positions in which this lever 62 is shown in FIG. 6. This force F acting on the arm 86 is transmitted via the pin 63 to the link 52 and is effective to move this link in the direction of the right hand from the position in which this link is shown in FIG. 5 to the position shown in FIG. 6.

As the lever 62 is rocked clockwise from the position shown in FIG. 5 to the position shown in FIG. 6 in the manner described above, the pin 64 transmits a force of 2 F to the brake beam 8 via the clevis 65 since the distance between the pins 63 and 68 is twice the distance between the pins 64 and 68. This force of 2 F thus transmitted to the brake beam 8 (FIG. 1) is effective to move this brake beam 8 in the direction of the right hand, as viewed in FIG. 1, until the brake shoes 15 carried adjacent the opposite ends of this brake beam 8 are brought into contact with the tread surface of the wheels 1, 2 at the opposite ends of axle 5. Thereafter, the continued manual pull on the link 88 causes the brake shoe 15 carried adjacent each end of the brake beam 8 to be pressed against the tread surface of the corresponding wheel with a force of F.

It should be further noted that as the link 52 is moved in the direction of the right hand from the position in which it is shown in FIG. 5 to the position shown in FIG. 6, the force F transmitted to this link via the pin 63 is transmitted via the pin 53 to the upper end of the lever 36. The force F thus transmitted to the lever 36 via the pin 53 acts in the direction to effect rocking of the lever 36 clockwise about the pin 57 from the position in which it is shown in FIG. 5 to the position shown in FIG. 6. Since the lever 36 is pivotally connected midway its ends by the pin 40 to the fulcrum member 34 provided at the right-hand end of the push rod 27, this clockwise rocking of the lever 36 about the pin 58, is effective to pull the piston 26 (FIG. 2) against the yielding resistance of the spring 106 in the direction of the right hand with respect to the stationary brake cylinder body 20 as the lever 36 is rocked clockwise about the pin 57 from the position shown in FIG. 5 to the position shown in FIG. 6.

Since the brake shoes 15 carried adjacent the opposite ends of the brake beam 8 (FIG. 1) are now in contact with the tread surface of the corresponding wheels carried by the axle 5, the brake beam 8 cannot travel further in the direction of the right hand. Consequently, the pin 64, the opposite ends of which are anchored in the jaws of the clevis 65 which is integral with the at this time stationary brake beam 8, now becomes a fixed fulcrum for the lever 62 which is rockably mounted on this pin 64 midway the ends thereof. Therefore, the continued manual pull or force F transmitted from the rod 88 to the arm 86 via the pin 89 is now effective to rock the lever 62 clockwise about the pin 64.

The lower end of the lever 62 is pivotally connected to the right-hand end of the link 67 by the pin 68 and the left-hand end of this link 67 is pivotally connected to the lower end of the lever 71 by the pin 72. The lever 71 is pivotally mounted midway its ends on the pin 74 which constitutes a fixed fulcrum since the opposite ends of the pin 74 are anchored in the jaws of the clevis 73 which is integral with the truck bolster 9. Consequently, as the lever 62 is rocked clockwise about the now stationary pin 64 from the position shown in FIG. 6, the link 67 transmits via the pin 72 a force F to the lower end of the lever 71 to effect clockwise rocking of the lever 71 about the fixed fulcrum constituted by the pin 74.

The upper end of the lever 71 is pivotally connected by the pin 77 to the right-hand end of the link 76 and the left-hand end of this link 76 is pivotally connected by the pin 80 to the upper end of the lever 79. This lever 79 midway its ends is rockably mounted on the pin 82 the opposite ends of which are anchored in the jaws of the clevis 81 which is integral with the brake beam 7 midway the ends thereof. The lower end of the lever 79 is pivotally connected by the pin 85 to the right-hand end of the link 56 which may now be regarded as a fixed member.

In view of the above, it is apparent that as the lever 71 is rocked clockwise about the fixed pin 74 in the manner described above, a force F is transmitted via the pin 77 to the right-hand end of the link 76 and this link is moved or pulled in the direction of the right hand by this force F which in turn is transmitted via the pin 80 to the upper end of the lever 79. This force F thus transmitted to the upper end of the lever 79 is effective to rock this lever 79 clockwise about the pin 85 which pivotally connects the lower end of this lever 79 to the right-hand end of the link 56 which as aforestated, may be now regarded as a stationary member.

As the lever 79 is thus rocked clockwise about the pin 85, it is effective via the pin 82 to transmit a force of 2 F to the clevis 81 since the distance between the pins 80 and 85 is twice the distance between the pins 82 and 85. This force of 2 F is effective to move the brake beam 7 in the direction of the right hand, as viewed in FIG. 1, until the brake shoes 15 carried adjacent the opposite ends of the brake beam 7 are brought into contact with the tread surface of the corresponding wheels at the opposite ends of the axle 4. Thereafter, the continued manual pull on the link 88 causes the brake shoe 15 carried adjacent each end of the brake beam 7 to be pressed against the tread surface of the corresponding wheel with a force F.

It should be further noted that since the pin 63 pivotally connects the right-hand end of the link 52 to the arm 86 of lever 62, and the pin 53 pivotally connects the left-hand end of this link 52 to the upper end of the lever 36 which at its lower end is pivotally connected by the pin 57 to the left-hand end of the link 56 which, as aforesaid, is now assumed to be stationary, the above-mentioned clockwise rocking of the lever 62 about the pin 64 is effective via the link 52 and pins 63 and 53 to cause clockwise rocking of the lever 36 about the pin 57. Since the lever 36 is connected by the pin 40 to the fulcrum member 34 at the right-hand end of the push rod 27, this clockwise rocking of the lever 36 is effective to further pull the piston 26 against the yielding resistance of the spring 106 in the direction of the right hand with respect to the stationary brake cylinder body 20.

From the foregoing, it will be apparent that subsequent to the brake beam 8 being moved to the position in which the brake shoes 15 carried adjacent the opposite ends of this brake beam 8 are moved into contact with the tread surface of the corresponding wheels carried on the axle 5, the brake beam 7 is moved to the position in which the brake shoes 15 carried adjacent the opposite ends of this brake beam 7 are moved into contact with the tread surface of the corresponding wheels carried on the axle 4. Thereafter, the continued manual pull on the link 88 causes the brake shoe 15 carried adjacent each end of the brake beam 8 and also each end of the brake beam 7 to be pressed against the tread surface of the corresponding wheel with a force F.

Since the brake shoes 15 carried adjacent the opposite ends of each of the brake beams 7 and 8 are now into contact with the tread surface of the corresponding wheels carried respectively by the axles 4 and 5, these brake beams 7 and 8 cannot travel further in the direction of the right hand. Consequently, the pin 82 now becomes a fixed fulcrum. Therefore, the pins 82 and 74 constitute fixed fulcrums about which the respective levers 79 and 62 are rockable. Accordingly, the continued manual pull or force F transmitted from the rod 88 to the arm 86 via the pin 89 is now effective to rock the lever 62 clockwise about the pin 64. This clockwise rocking of the lever 62 transmits a force F via the link 67 to cause clockwise rocking of the lever 71 about the pin 74, and this clockwise rocking of the lever 71, in turn, transmits a force F via the link 76 to the lever 79 to cause corresponding clockwise rocking of the lever 79 about the now stationary pin 82. The lower end of the lever 79 is pivotally connected by the pin 85 to the right-hand end of the link 56. Therefore, this clockwise rocking of the lever 79, about the pin 82 transmits a force F to the link 56 to move this link substantially in the direction of the left hand.

It should be noted that the above-mentioned clockwise rocking of the lever 62 about the pin 64 transmits via the pin 63 a force F to the link 52 which link 52 at its left-hand end transmits via the pin 53 a force F to the upper end of the lever 36. The lower end of this lever 36 is pivotally connected by the pin 57 to the left-hand end of the link 56 to which a force F has been transmitted by the pin 85 in the manner explained above. It will be apparent from FIG. 8 of the drawings that the above-mentioned equal forces transmitted to the respective opposite ends of the lever 36 act in opposite directions and therefore form a couple which is effective to rock the lever 36 clockwise about the pin 40. Consequently, it will be apparent from FIGS. 7 and 8 that this clockwise rocking of the lever 36 about the pin 40 effects movement of the left-hand end of the link 56 into contact with the web 90 that connects the converging ends of the arms 91 and 92 of the hand brake member 93 and thereafter transmits a force F to the web 90 to effect clockwise rocking of this member 93 about the pin 98.

It will be remembered that these arms 91 and 92 of the hand brake member 93 are respectively pivotally mounted on the pins 102 and 104 which have their opposite ends anchored in the lugs and the support members 45 and 46 which lugs and support members are integral with the bracket member 47 that is secured by the rivets 48 to the inturned flange 19 which is an integral part of the brake beam 6. Therefore, the continued above-mentioned clockwise rocking of the hand brake member 93 about the pin 98 is effective to cause the force F transmitted to the web 90 to move the brake-cylinder-carrying brake beam 6 in the direction of the left hand until the brake shoes 15 carried adjacent the respective opposite ends of this brake beam are brought into contact with the tread surface of the corresponding wheels carried at the opposite ends of the axle 3.

Since the distance between the web 90 and pin 98 is twice the distance between the pins 98 and 102, a force of 2 F will be exerted in the direction of the left hand on the brake beam 6 at the pin 102. Therefore, the brake shoes 15 carried adjacent each end of the brake beam 6 will be pressed against the tread surface of the corresponding wheel carried by the axle 3 with a force of F.

The brake shoe 15 carried adjacent each end of each of the brake beams 6, 7 and 8 is now in contact with the tread surface of the corresponding wheel of the three-axle six-wheel truck, and the continued manual pull on the link 88 causes each of the six brake shoes 15 to be pressed against the tread surface of the corresponding wheel with the same force F so that a uniform braking force is exerted on each of the six wheels of the car truck.

The manual brake application can be released by the trainman rotating the hand wheel at the end of the car in the direction to cause a release of the pull on the link 88.

Having now described the invention, what I claim as new and desire to secure by Letters Patent is:

1. A brake rigging for a three axle type of railway vehicle truck having a longitudinal axis and a transverse axis, which brake rigging comprises the combination of:
    (a) three brake beams extending in spaced substantially parallel relation to the transverse axis of the vehicle truck, and guidably supported at the ends thereof on the truck for bodily movement longitudinally of the truck,
    (b) a brake cylinder casing secured to one of said brake beams substantially midway the ends thereof and having its longitudinal axis parallel to the longitudinal axis of the truck,
    (c) a piston operable in said brake cylinder casing and cooperating therewith to form a pressure chamber in which fluid under pressure exerts a force on said piston and a reactionary force on the brake cylinder casing, said piston having a piston rod movable therewith longitudinally of the truck, and
    (d) linkage means operatively connecting said piston rod and each of the other brake beams by which to transmit the fluid pressure force exerted on said piston to each of the other brake beams substantially midway the ends thereof, the reactionary force on said brake cylinder casing thereby effecting movement of said one brake beam in one direction and the force on the said piston effecting movement of the other brake beams in an opposite direction with respect to the corresponding said axles in response to the supply of fluid under pressure to said pressure chamber.

2. A brake rigging for a three axle type of railway vehicle truck, as claimed in claim 1, further characterized in that the said linkage means is so constructed and arranged that upon the supply of fluid under pressure to said pressure chamber said linkage means is effective to cause equal forces to be transmitted to said three brake beams.

3. A brake rigging for a three axle type of railway vehicle truck, as claimed in claim 1, further characterized in that:
    (a) said vehicle truck comprises,
        (i) a bolster,
    (b) said linkage means comprises:
        (i) a first lever pivotally mounted midway its ends on said piston rod,
        (ii) a second lever pivotally mounted midway its ends on the center one of said three spaced brake beams,
        (iii) a third lever pivotally mounted midway its ends on said bolster,
        (iv) a fourth lever pivotally mounted midway its ends on the third one of said three brake beams,
        (v) a first link pivotally connecting one end of said first lever and one end of said fourth lever,
        (vi) a second link pivotally connecting the other end of said first lever and one end of said second lever,
        (vii) a third link pivotally connecting the other end of said second lever and one end of said third lever, and
        (viii) a fourth link pivotally connecting the other end of said third and fourth levers,
        (ix) said levers and links cooperating to effect the transmission of equal braking forces to each of said three brake beams upon the supply of fluid under pressure to said pressure chamber.

4. A brake rigging for a three axle type of railway vehicle truck, as claimed in claim 3, further characterized in that each of said plurality of levers and links is disposed substantially in a horizontal plane, and in that said links extend longitudinally in substantially parallel spaced-apart relationship.

5. A brake rigging for a three axle type of railway vehicle truck, as claimed in claim 3, further characterized by:
    (a) a fifth lever rockable about one end thereof and pivotally mounted intermediate its ends on said one brake beam, the other end of said fifth lever being disposed in the path of movement of one end of said one lever, and
    (b) hand-operated means for applying force to said one end of said fourth lever to cause a movement of force to be exerted on said one lever via certain of said other levers and links thereby to effect rocking of said fifth lever about its said one end to cause brake applying movement of said one brake beam.

6. A brake rigging for a three axle type of railway vehicle truck, as claimed in claim 3, further characterized by a horizontally disposed support member pivotally mounted at one end on said one brake beam, said support member being operatively connected at its opposite end to said one lever whereby said support member supports said one lever.

7. A brake rigging for a three axle type of railway vehicle truck, as claimed in claim 3, further characterized in that said second and fourth levers are respectively pivotally mounted substantially midway the ends of the said center one and said third one of said three spaced brake beams, and in that said third lever is pivotally mounted substantially midway the ends of said bolster.

8. A brake rigging for a three axle type of railway vehicle truck, as claimed in claim 3, further characterized in that each of said second, third and fourth levers is rocked in the same direction upon the supply of fluid under pressure to said pressure chamber.

9. A brake rigging for a three axle type of railway vehicle truck, as claimed in claim 3, further characterized in that the length of said first link is substantially equal to the sum of the lengths of said second, third and fourth links.

10. A brake rigging for a three axle type of railway vehicle truck, as claimed in claim 3, further characterized in that said first and third links move in one direction, and in that said second and fourth links move concurrently in an opposite direction in response to supply of fluid under pressure to said pressure chamber.

11. A brake rigging for a three axle type of railway vehicle truck, as claimed in claim 5, further characterized by a support member pivotally mounted at one end on said one brake beam for pivotally supporting on the opposite end thereof said one lever and the exterior end of said piston rod whereby, upon the application of force to said one end of said fourth lever by said hand-operated means to cause a moment of force to be exerted on said one lever via certain of said other levers and links, said piston rod and said piston are moved relative to said brake cylinder casing.

12. A brake rigging for a three axle type of railway vehicle truck, as claimed in claim 5, further characterized in that said fifth lever and each of said other levers is rocked in the same direction in response to the application of force by said hand-operated means to said one end of said fourth lever.

References Cited

UNITED STATES PATENTS 2,958,398  11/1960  Newell _____ 188—52
3,184,000  5/1965   Radey _____ 188—47 X DUANE A. REGER, *Primary Examiner.*